(12) United States Patent
Tietjen (10) Patent No.: US 7,903,038 B2
(45) Date of Patent: Mar. 8, 2011

(54) MOBILE RADAR ARRAY

(75) Inventor: Byron W. Tietjen, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 29 days.

(21) Appl. No.: 11/636,043

(22) Filed: Dec. 8, 2006

(65) Prior Publication Data

US 2008/0136718 A1 Jun. 12, 2008

(51) Int. Cl.
 *H01Q 1/32* (2006.01)
 *H01Q 1/00* (2006.01)
 *G01S 7/02* (2006.01)

(52) U.S. Cl. .............. 343/711; 343/700 R; 342/175

(58) Field of Classification Search .......... 342/70–72, 342/175, 95, 367–384, 42, 45, 25 R–25 F, 342/26 R–26 B, 195; 343/711–717, 741, 343/757, 763, 766, 700 MS, 705–708; 340/438, 340/442, 445, 447, 461; 73/146–146.5; 152/151, 152/152.1; 246/20, 27, 28 R, 62, 63 R, 63 C, 246/63 A
See application file for complete search history.

(56) References Cited

U.S. PATENT DOCUMENTS

| | | | | |
|---|---|---|---|---|
| 1,883,476 A | * | 10/1932 | Bartsch | 343/711 |
| 1,888,777 A | * | 11/1932 | Stein | 343/711 |
| 2,093,217 A | * | 9/1937 | Ray et al. | 343/711 |
| 3,950,726 A | * | 4/1976 | Fujikawa et al. | 340/447 |
| 4,090,172 A | * | 5/1978 | Vesnic | 343/712 |
| 4,319,220 A | * | 3/1982 | Pappas et al. | 340/447 |
| 4,697,179 A | * | 9/1987 | Arimitsu et al. | 246/63 R |
| 5,867,093 A | * | 2/1999 | Dodd et al. | 340/461 |
| 5,926,127 A | * | 7/1999 | Schmidt et al. | 342/70 |
| 6,400,325 B2 | * | 6/2002 | Aaltonen | 343/711 |
| 6,501,372 B2 | * | 12/2002 | Lin | 340/442 |
| 6,606,057 B2 | * | 8/2003 | Chiang et al. | 342/374 |
| 6,646,616 B2 | * | 11/2003 | Tietjen | 343/757 |
| 6,657,589 B2 | * | 12/2003 | Wang et al. | 343/711 |
| 6,734,791 B2 | * | 5/2004 | Kelly et al. | 340/445 |
| 6,753,822 B2 | * | 6/2004 | Tietjen | 343/757 |
| 6,812,904 B2 | * | 11/2004 | Tietjen | 343/757 |
| 6,816,118 B2 | * | 11/2004 | Kingsley et al. | 343/700 MS |
| 6,825,759 B2 | * | 11/2004 | Yamagiwa et al. | 340/445 |
| 6,842,151 B2 | * | 1/2005 | Tenten | 343/711 |
| 6,850,201 B2 | * | 2/2005 | Tietjen | 343/757 |
| 6,861,983 B2 | * | 3/2005 | Casabona et al. | 342/370 |
| 6,882,321 B2 | * | 4/2005 | Tietjen | 343/757 |
| 6,888,471 B2 | * | 5/2005 | Elsner et al. | 340/442 |
| 6,985,117 B2 | * | 1/2006 | Voigtlaender et al. | 343/711 |
| 6,995,731 B2 | * | 2/2006 | Lin | 343/711 |
| 7,081,868 B2 | * | 7/2006 | Choi et al. | 343/711 |
| 7,104,298 B2 | * | 9/2006 | Starinshak | 340/445 |

(Continued)

OTHER PUBLICATIONS

B.W. Tietjen, "The Rolling Radar"; Radar Conference, 2005 IEEE International; May 9-12, 2005; pp. 16-21; ISBN 0-7803-8881-X.*

(Continued)

*Primary Examiner* — Bernarr E Gregory (74) *Attorney, Agent, or Firm* — Howard IP Law Group, PC (57) ABSTRACT

A mobile radar array system comprising a towable platform having a pair of wheels operably coupled thereto, the wheels adapted for rolling along a road surface; and an antenna array mounted on a side of at least one of the wheels, the antenna array, when energized, capable of providing a radiation pattern for detecting a moving object.

20 Claims, 6 Drawing Sheets

U.S. PATENT DOCUMENTS

| | | | |
|---|---|---|---|
| 7,129,901 B2 * | 10/2006 | Tietjen | 343/757 |
| 7,151,495 B2 * | 12/2006 | Strache et al. | 343/713 |
| 7,180,410 B2 * | 2/2007 | Logan et al. | 343/711 |
| 7,183,989 B2 * | 2/2007 | Tietjen | 343/757 |
| 7,199,764 B2 * | 4/2007 | Tietjen et al. | 343/757 |
| 7,250,914 B2 * | 7/2007 | Kish et al. | 343/711 |
| 7,253,784 B2 * | 8/2007 | Shimura | 343/711 |
| 7,256,748 B2 * | 8/2007 | Tietjen | 343/763 |
| 7,310,069 B2 * | 12/2007 | Nantz et al. | 343/711 |
| 7,317,423 B2 * | 1/2008 | Shimura | 343/711 |
| 7,446,718 B2 * | 11/2008 | Myatt | 343/711 |
| 7,453,407 B2 * | 11/2008 | Logan et al. | 343/711 |
| 7,492,328 B2 * | 2/2009 | Kish et al. | 343/711 |
| 2003/0156067 A1 * | 8/2003 | Tenten | 343/711 |
| 2003/0164799 A1 * | 9/2003 | Nantz et al. | 343/711 |
| 2003/0193442 A1 * | 10/2003 | Tietjen | 343/757 |
| 2003/0193444 A1 * | 10/2003 | Tietjen | 343/766 |
| 2004/0004575 A1 * | 1/2004 | Tietjen | 343/757 |
| 2004/0016488 A1 * | 1/2004 | Benedict et al. | 152/152.1 |
| 2004/0017321 A1 * | 1/2004 | Benedict et al. | 343/741 |
| 2004/0159383 A1 * | 8/2004 | Adamson et al. | 152/152.1 |
| 2004/0189456 A1 * | 9/2004 | Myatt | 340/445 |
| 2004/0252072 A1 * | 12/2004 | Adamson et al. | 343/711 |
| 2004/0263404 A1 * | 12/2004 | Voigtlaender et al. | 343/713 |
| 2005/0132789 A1 * | 6/2005 | Starinshak | 73/146 |
| 2005/0132790 A1 * | 6/2005 | Starinshak | 73/146 |
| 2005/0133131 A1 * | 6/2005 | Starinshak | 152/152.1 |
| 2005/0133132 A1 * | 6/2005 | Girard et al. | 152/152.1 |
| 2005/0162325 A1 * | 7/2005 | Tietjen | 343/757 |
| 2005/0225493 A1 * | 10/2005 | Tietjen | 343/763 |
| 2005/0231433 A1 * | 10/2005 | Nantz et al. | 343/713 |
| 2006/0022879 A1 * | 2/2006 | Kish et al. | 343/711 |

OTHER PUBLICATIONS

B.W. Tietjen, "The Rolling Radar"; "IEEE Aerospace and Electronic Systems Magazine"; vol. 20, issue 9; Sep. 2005; pp. 18-24; ISSN 0885-8985.*

* cited by examiner

MOBILE RADAR ARRAY

FIELD OF THE INVENTION

The present invention relates generally to radar systems and more specifically to mobile radar arrays.

BACKGROUND OF THE INVENTION

There is a growing interest in mobile radars capable of long range and/or short range target detection and tracking. However, various problems exist in the current design and implementation of mobile radars. Such problems include adapting radars and associated towing or conveying equipment due to weight, size, and/or time constraints. For example, difficulties arise when attempting to fit considerable radar performance within a radar package that is mobile and that may be set up and operational within a relatively short time window (e.g. less than 10 or 20 minutes.) A specific problem occurs when one attempts to tow a mobile radar on a trailer or other vehicle. The additional weight of the trailer is significant (e.g. typically over 1000 pounds (lbs.)) and may diminish the portability, speed and ultimate usefulness of the mobile radar system. In addition, an aircraft may be required to transport a mobile radar system to a given location in which the mobile radar is to be deployed. One of the constraints might include the requirement that the mobile radar fit inside a cargo plane such as a C130 aircraft. For a radar mounted onto a trailer, such additional transportability constraint places limits on the size of the array that can be designed which in turn, can be a limiting factor in radar performance. Furthermore, prior art systems required removing the radar system from the truck or trailer and separately mounting the system so that it can serve to detect and track targets. Such additional mounting and disassembly results in undesirable delays in system deployment and operation. Moreover, few opportunities exist at present to conserve weight and advance the portability of radar systems, such as Counterfire Target Acquisition (CTA) type radars. Furthermore, prior art systems required removing the radar system from the truck or trailer and separately mounting the system so that it can serve to detect and track targets. Such additional mounting and disassembly results in undesirable delays in system deployment and operation. Moreover, few opportunities exist at present to conserve weight and advance the portability of radar systems, such as CTA type radars.

It would be desirable to provide an apparatus that addresses one or more of the aforementioned problems, and provides for rapid set up while allowing flexibility in utilizing the system. A mobile radar system that enables the detection and tracking of targets and that can be easily transported to any desired location in a simple and efficient manner is highly desired.

SUMMARY OF THE INVENTION

An antenna system for a radar apparatus comprising: a vehicle wheel having a hub portion, with an antenna mounted on the hub portion of the vehicle wheel, the antenna when energized capable of providing a first radiation pattern, and wherein when the vehicle wheel is rotated, the antenna rotates accordingly.

According to an aspect of the invention, a mobile radar array comprises a towable platform having wheels operably coupled thereto for rolling along the ground in a transport mode; a radar antenna array mounted on an outer side of one of the wheels; a lift operably coupled to the platform for elevating the wheels from the ground surface in a deployment mode; and a rotatable member for revolving the wheels about an azimuthal axis in the deployment mode.

According to another aspect of the invention, a phased array radar system contains a pair of radar arrays mounted on two convertibly tiltable coupled wheel frames of a trailer. The radar arrays form two geometrically opposed apertures. The two apertures may be electronically combined and are rotatable over 360 degrees. The radar array system includes a variable orientation with respect to elevation and direction of the apertures dependent upon the operational application of the system.

In yet another aspect, a method of providing a mobile radar system comprises the steps of: providing a vehicle platform and operably coupling the platform to a rotatable axle, coupling one wheel to each end of the axle, providing a housing on the platform between the wheels, mounting a first antenna about the hub portion of at least one of the wheels, coupling the platform to a vehicle to transport the antenna and housing during a transportation mode wherein the wheels roll on the ground and support the platform in response to the vehicle movement, elevating the wheels in a radar operating mode when the vehicle is not in the transportation mode, to raise the wheels above the ground, and energizing the first antenna when the wheels are raised during the radar operating mode.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and wherein.

DETAILED DESCRIPTION

It is to be understood that the figures and descriptions of the present invention have been simplified to illustrate elements that are relevant for a clear understanding, while eliminating, for the purpose of clarity, many other elements found in radar systems and portable instrumentation and methods of making and using each of the same. Those of ordinary skill in the art may recognize that other elements and/or steps may be desirable in implementing the present invention. However, because such elements and steps are well known in the art, and because they do not facilitate a better understanding of the present invention, a discussion of such elements and steps is not provided herein.

Figure 1A:
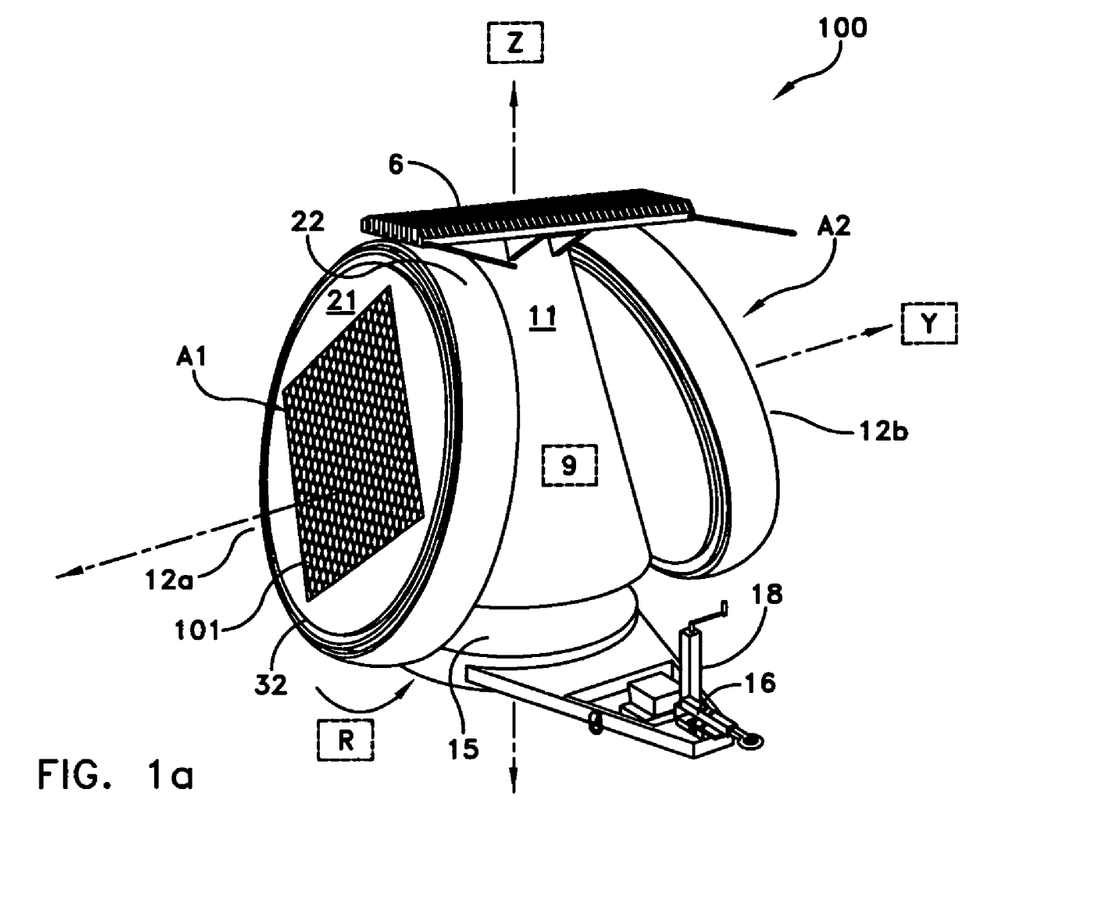
FIG. 1a is a perspective view of an exemplary mobile radar array having a towable platform and trailer wheels operably coupled to the platform, with an antenna array mounted to at least one of the trailer wheels, in a transportable mode, according to an embodiment of the present invention.
Figure 1B:
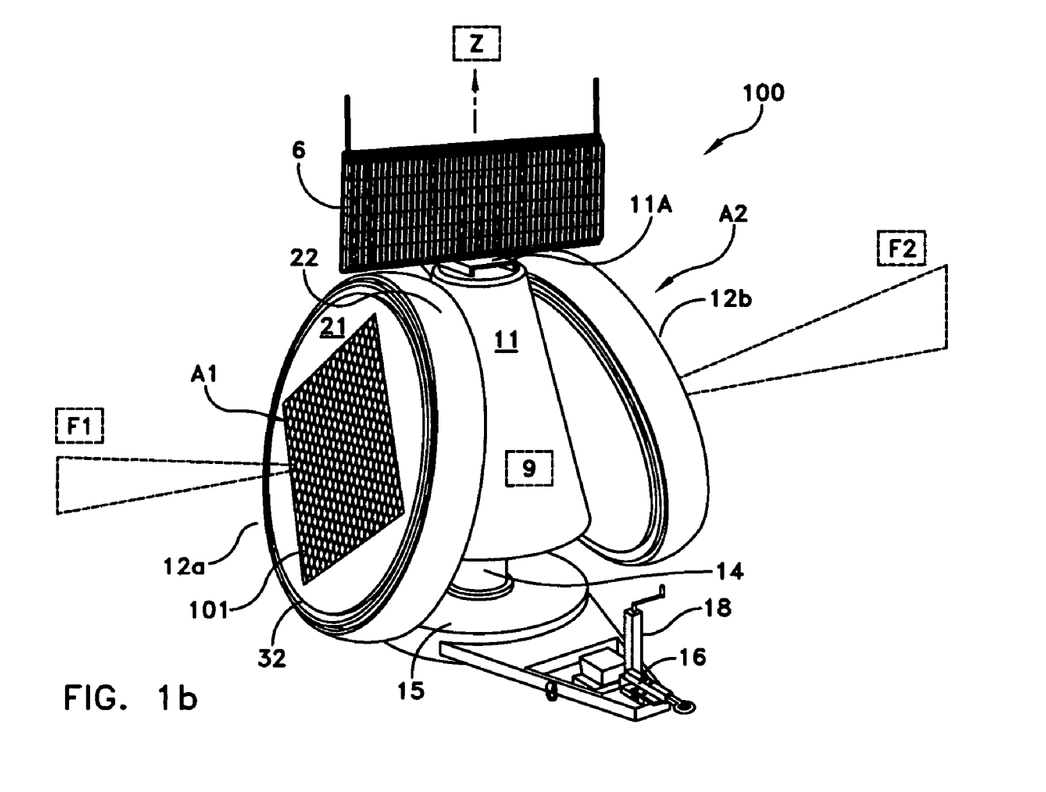
FIG. 1b is a perspective view of the exemplary mobile radar array of FIG. 1a in a deployment mode according to an embodiment of the present invention.
Figure 1C:
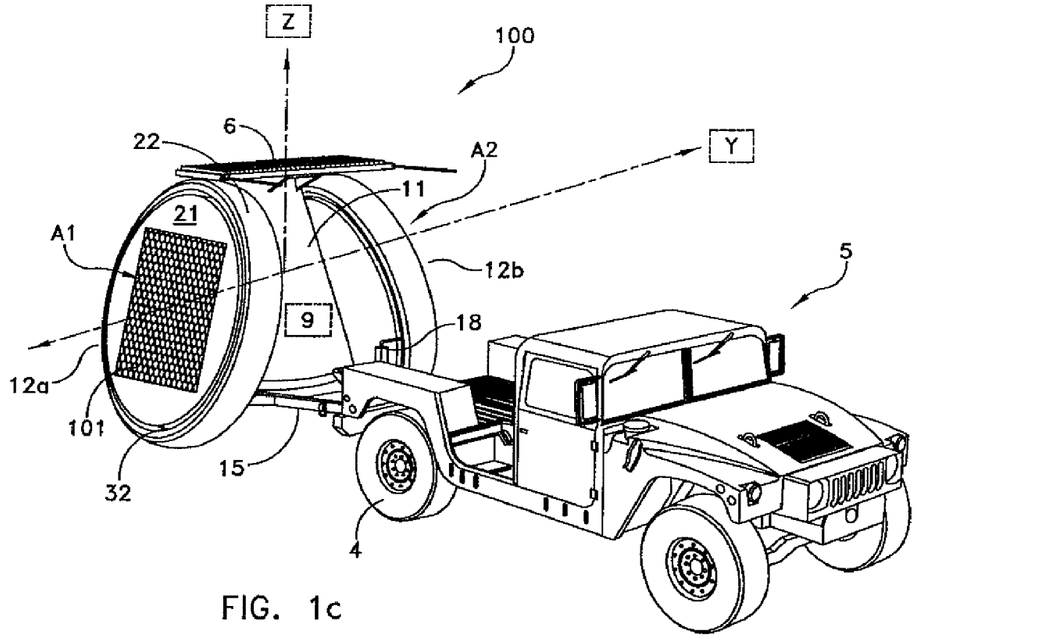
FIG. 1c is a perspective view of the mobile radar array of FIG. 1a in the transportable mode attached to a towing vehicle.

Referring now generally to FIGS. 1a-1c, FIG. 2, and FIGS. 3a-3b, and in particular to FIG. 1c, there is shown a perspective view of a vehicle 5 and a rotatable array antenna system 100 comprising a trailer or towable platform 15, a set of trailer coupled wheels 12a, 12b and an antenna array A1 mounted onto the outer side of at least one of the two wheels, and operable for detecting and/or tracking moving objects. In a preferred embodiment, the system comprises two radar antenna array apertures A1, A2 positioned in opposed orientation to one another and each attached or otherwise mounted to a corresponding one of trailer coupled wheels 12a, 12b.

As illustrated in FIG. 1a, the antenna system 100 and the wheels 12a, 12b are shown normal to the vehicle chassis and parallel with the vehicle 5 wheels 4, which is essentially the transportable state of the trailer as it is pulled by vehicle 5 (FIG. 1c). FIG. 1a is a perspective view of the towable mobile radar array system 100 detached from towing vehicle 5, while FIG. 1b is a perspective view of the towable mobile radar array system in a deployment mode where the wheels 12a, 12b, previously used to transport the trailer are converted into a scanning platform for the antenna system 100.

Each antenna array A1, A2 (FIG. 1a) is mounted on an outer side of a wheel 12a, 12b and may comprise a phased array antenna frame configuration which employs a plurality of individual antenna elements 101 or subarrays of antenna elements that are separately excited to cumulatively produce a transmitted electromagnetic wave that is highly directional. The radiated energy from each of the individual antenna elements or subarrays is of a different phase, respectively, so that an equiphase beam front or cumulative wave front of electromagnetic energy radiating from all of the antenna elements in the array travels in a selected direction. The differences in phase or timing among the antenna activating signals determines the direction in which the cumulative beam from all of the individual antenna elements is transmitted.

Analysis of the phases of return beams of electromagnetic energy detected by the individual antennas in the array similarly allows determination of the direction from which a return beam arrives. A phased-array radar system typically has an array of antenna elements each connected to radar signal generation and reception circuitry 9 that may be contained in housing 11. Each antenna element radiates when supplied with radar frequency power ("RF drive signals"), and responds to incident radiation of appropriate frequency by producing a received signal. Received signals are down-converted to intermediate frequency (IF) by mixing with a local oscillator (LO) signal. In transmission, the output radar beam direction is controlled by the phase relationship between the RF drive signals to individual antenna elements in the array. If the RF drive signals are all in phase with one another, the output beam direction is perpendicular to the phased-array where the antenna array is a planar system. If the drive signal phase varies linearly with antenna element position across the array, the output beam is inclined at an angle to the array. Altering the rate at which phase varies with position alters the output beam inclination and provides the received signal phase as a function of array position. This may be achieved by varying the LO phase across the array, or by inserting differing delays into received signal paths. Such processing as described above is well known to those of ordinary skill in the art.

A pulse based radar system is usually employed to scan a field of view while emitting timed RF pulses of energy. Such radar systems, including for example, CTA type radar systems, often function as both short range and long range target detection and tracking systems. Long range (e.g. on the order of 60 kilometers (Km) or more) detection requires relatively long pulse repetition intervals (PRI) and a narrow transmission beam. The physical features of a CTA type radar system do not lend themselves to portability, as they generally require large rotating apparatuses that scan a full 360 degree azimuth.

A conventional radar array contains a plurality of radiating elements configured to define an array aperture for generating a narrow beam for long range detection and track performance. The longer PRI reduces the probability of detecting high vertical velocity, shorter range targets (e.g. targets within about 15 Km). In order to alleviate this problem, systems may utilize separate short range (SR) and long range (LR) pulses in an attempt to cover all target ranges.

For an example of a suitable single antenna array, reference is made to U.S. Pat. No. 6,812,904 ('904) entitled "Rolling Radar Array" issued on Nov. 2, 2004 to Byron W. Tietjen the inventor herein and assigned to Lockheed Martin the assignee herein, the disclosure of which is incorporated by reference herein. That patent, in part, depicts a radar array mounted on a circular wheel. The wheel has a circumferential portion adapted to engage a path disposed on a platform for revolving the radar array about the platform. The wheel rotates about an axle as the array revolves about the platform.

Still referring to FIGS. 1a, 1b and 1c, in an exemplary embodiment the wheels 12a and 12b are of a larger diameter than conventional wheels of those of vehicle 5. Each wheel 12a and 12b has a peripheral tire 22 disposed on a rim or central hub portion 21 on which the antennas A1 and A2 are mounted and secured. The tire may be a conventional rubber, threaded tire used to transport articles. Each antenna array (A1, A2) is mounted on a corresponding wheel using vibration isolator(s) 32. Such isolators may be embodied as an arrangement of spiral flexure springs such as those employed on the wheels of the Mars Exploration Rover (MER), for example. Isolators 32 may serve to vibrationally dampen and/or electronically and vibrationally isolate the antenna array from the wheel, particularly during transport mode of the array. Radar system electronics 9 are contained in housing 11 of the antenna system 100 for providing power, control, communications and/or processing capabilities to the array system. In one configuration, the radar electronics circuitry includes receiver/transmitter functionality, signal processing functionality and azimuth drive and control modules for the antenna system.

As shown in FIG. 1b, two antenna system aperture arrays A1, A2 are mounted upon the wheels 12a, 12b respectively, which are illustrated in a vertically elevated position through lift jack 14. Lift 14 may retractably extend the platform 15 to the ground (surface) for elevating the wheels. The arrays may be tilted in a position relative to chassis level (ground plane normal) so as to impart beam elevation and direction for the radar's operation. The lift jack 14 is positioned at the base of the pedestal and secured to the pedestal or chassis platform 15. The vertical distance of the wheels (and hence the array antennas) from the ground or surface when the system is in the deployed mode and the tilted position of its wheels 12a, 12b are dependent upon the application of the radar utilizing the antenna system 100.

As shown in FIGS. 1a, 1b and 1c, the trailer 15 includes by way of example a retractable trailer hitch 16. The support platform 15 is releasably secured to the towing vehicle and supported by a jack such as hand jack 18 and/or other support jacks. Although specific embodiments of the retractable trailer hitch 16, support platform 15, lift mechanism 14 and hand jack 18 are illustrated, those of ordinary skill in the art recognize other alternative means, manners and methods of transporting and fixing the elevation for a particular application of system 100 are possible.

According to an aspect of the invention, reducing overall weight of a mobile radar is accomplished by combining the design of the radar and trailer into a single integrated package. The mobile radar system according to one embodiment includes a radar antenna array A1 disposed on the face of a large rotatable wheel 12a. The wheel is a vehicle wheel having a tire portion 22 and a hub portion 21 upon which the antenna array is positioned. An array can be used with one or both wheels of a two wheel trailer if additional data rates are needed. The wheels are rotatably connected to the antenna pedestal or a chassis platform such that the entire package can be towed. Similar to the design of a chariot, the integrated assembly can be towed by a vehicle connected by a hitch. The wheels can also be slanted (as shown in FIG. 1b) if the array itself needs to be tilted for elevation coverage.

The integrated assembly configuration enables relatively short set up time. When the radar/trailer assembly is towed to the proper location, the platform base 15 is extended downward via lift mechanism 14 (such as a hydraulic jack) to the surface (e.g. ground), thereby raising the array/wheels off the ground so that they can rotate. Each array/wheel combination can then be spun slowly by hand (e.g. in the direction R shown in FIG. 1a) and locked into a desired position of operation via a conventional locking mechanism (not shown). The array/wheel is connected to power and data cables from the pedestal housing 11 through for example, apertures in cross member 23 (FIG. 2) and corresponding through apertures in the housing and the wheel hub/antenna frame mounting.

Once the wheel has been rotated to enable the appropriate radar antenna orientation (relative to horizontal axis Y, for example) the array may be further elevated (for example along vertical or azimuthal axis Z) with respect to the ground to enable appropriate clearance of the array for revolving about the azimuthal axis (Z). An additional antenna such as an IFF antenna 6 can also be optionally located on top of the pedestal. This can be lowered for transport and raised for operation. As seen in FIGS. 1a and 1b the optional IFF antenna array can be pivotally mounted on the top surface 11a of housing 11. The IFF array can be pivoted so that it extends vertically from the top surface and pivoted to lie in the horizontal plane when not in use or during a transportation mode.

Figure 2:
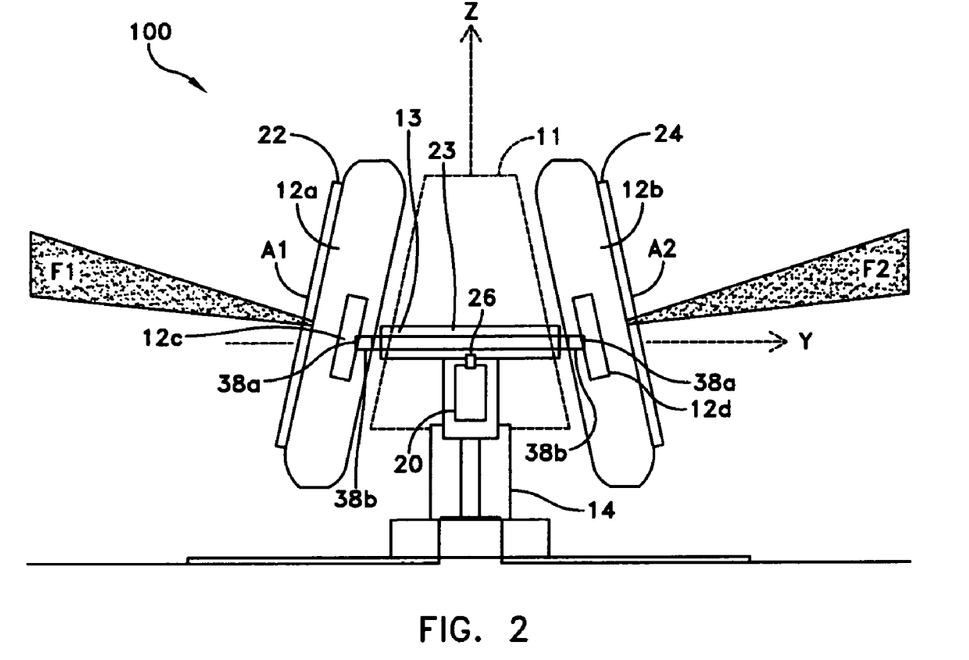
FIG. 2 is a schematic front view of a rotatable radar array (with housing not shown) mounted on elevated trailer wheels according to an embodiment of the present invention.

FIG. 2 shows a front schematic view of a phase array antenna system 100 according to an exemplary embodiment, having two antenna arrays of apertures A11, A22 in opposed orientations in an elevated or deployed position. The coupled wheels 12a, 12b attach through a mating pair of pivotable hub mounts 38a, 38b to respective wheel hubs 12c, 12d so that as axle 13 is lifted by the action of a mechanical or hydraulic jack 14, the wheels 12a,12b move (in the vertical direction) accordingly. The axle 13 is shown contained in a rotatable cross member housing 23, which is driven though a shaft and spline 19 by a controllable motor 20. The phase array antenna system 100 in FIG. 2 may also include antenna frames 222, 224 mounted to the wheel hub and which contain the radiating elements 101 that form the array apertures for A1, A2, respectively, as is understood by one of ordinary skill in the art.

FIG. 2 includes two representative RF beam patterns F1, F2, each of which point in a given direction according to the position of the associated antenna, as might be desirable when tracking multiple radar targets. RF beam patterns F1, F2, may each be electronically configured for detecting long range targets or each may be electronically configured for detecting short range targets. However, one of the transmissions such as F1 may also be directed at detecting long range targets and the other transmission such as F2 may be directed at detecting short range targets. Suitable signal processing electronics (e.g. contained in housing 11) is utilized for performing such target detection/tracking. Each of the pairs A1, A2 have directional patterns that include a plurality of sidelobes. Each sidelobe is separated from the adjacent sidelobe, and from any adjacent main lobe, by a null in the antenna or beam pattern. Transmission lobes F1 and F2 emanate from apertures associated with A1, A2. The elevation angle of apertures A11, A22 are oriented in position by the application of a steering or tilting system so as to position the wheels at an appropriate angle/position, as is understood by one skilled in the art.

Figure 3A:
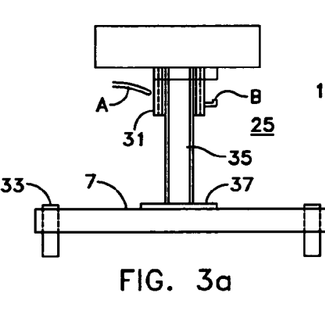
FIG. 3a is a schematic front view of a lifting jack to vertically elevate the trailer wheels according to an embodiment of the present invention.
Figure 3B:
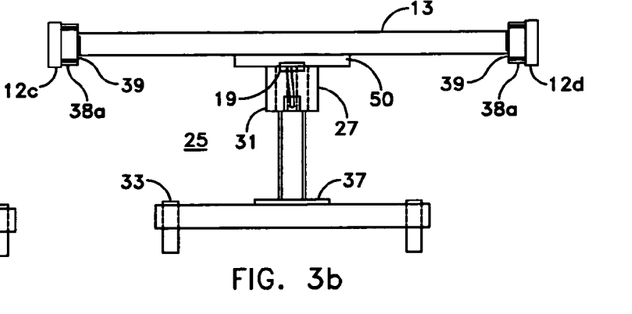
FIG. 3b is a schematic side view of a lifting jack to vertically elevate the trailer wheels according to an embodiment of the present invention.

FIGS. 3a and 3b are elevation views of an exemplary hydraulic lifting mechanism 25 including a jack 14 (see e.g., FIG. 1a), to move and elevate the wheels 12a, 12b. The mechanism is supported by post, axle or rod 35 as attached to the trailer chassis 15 though footplate 37. Support jacks 33 may be used in support of the trailer chassis when moving the wheels 12a, 12b from the rest or transport position vertically. Lifting mechanism 14 may further comprise a shroud 27 (FIG. 3b), which preferably is formed of a steel square cross-sectioned channel. Shroud 27 is secured to lift axle 13 by welding or via a shaft and spline 19 to a plate 50. The plate 50 may have included thereon a rotating mechanism for enabling rotation of the assembly about the Z-axis. Alternatively, a rotating mechanism may be disposed within the platform 15. Operatively attached to the distal ends of axle 13 are mounts 38a, 38b having corresponding through holes (e.g. reference numeral 39).

In an exemplary embodiment, wheel hubs 12c, 12d attach through mating mounts 38a, 38b respectively so that as the axle 13 is lifted by the action of a hydraulic pump assembly 41 (FIGS. 3a-3b), the wheels 12a,12b attached to the hubs 12c, 12d move accordingly. The powered hydraulic pump assembly 41 connects to the hydraulic cylinder 31 through connections A, and B. The cylinder has a piston which is operated when hydraulic fluid enters the cylinder, as is known. Hydraulic pump assembly 41 is in fluid communication through hoses 51, 53 that provide and return hydraulic fluid to the cylinder 31 to supply pressurized fluid to cylinder 31 for the selective upward extension and downward retraction of the axle 13 relative to the trailer to accomplish lifting thereof.

Viewing FIG. 3a and FIG. 1a-c, a remote control means 58 is coupled (e.g. by a cable 59 or by a wireless connection) to the hydraulic pump assembly 41, which includes a switchable motor control (not shown) to permit an operator to control lifting mechanism 25 while viewing the lifting operation from a safe distance from the trailer or truck 5. The remote control means 58 may be operated via programmed control for certain radar applications. An electrical power jack 55 may be disposed in the bed of truck 5 and coupled to the electrical system 60 of truck 5 to provide electrical power to power hydraulic pump 41. Pump assembly 41 operatively couples to jack 55 through a detachable electrical plug 56 and an electrical cable 57. This arrangement permits the trailer and lifting mechanism 25 and its electrical power supply input to be coupled and uncoupled rapidly from truck 5.

As previously indicated the wheels 12a, 12b can be oriented if the array itself needs to be tilted (e.g. for elevation coverage). Mechanisms for tilting are well known, and such mechanisms and associated control circuits may be used to opposedly tilt or cant the wheels 12a, 12b in relation to one another once the wheels are moved into a raised vertical position as illustrated in FIG. 3b.

A drive system 300 for the scanning radar array assembly of 100 may be included within platform 15 and/or of footplate 37 for rotating or revolving the assembly about the Z-axis to scan a field of view. In brief, the drive system may operate to rotate post 35 (or a rotatable member or shaft within post 35) operably coupled to cross arm member 23 in housing 11 and attached to wheels 12a, 12b, about the Z-axis to thereby cause the wheels and hence the corresponding antenna arrays A1, A2 to revolve about the central axis (i.e. Z-axis). Drive systems for revolving an antenna array are well known. In a simplified example, the drive system may include a rotatable bullring gear, rotatably mounted to the platform 15 by way of a fixed ring portion and bearings for substantially eliminating friction between the fixed portion and the rotatable ring portion. A motor clutch (not shown) may engage the motor shaft having a pinion gear mounted thereto in order to drive the rotatable ring portion of the bullring gear, causing rotation (about the Z-axis) of the rod 14 and corresponding mount for axle 13 and/or cross member 23, such that as the rotatable ring portion rotates, the axle and cross member and associated coupled wheel hubs 12c, 12d, wheels 12a, 12b attached thereto of radar antenna array 100 rotates or revolves radar antenna array 100 about the "Z" axis or central axis (CA). The drive operates to rotate or revolve the antenna array 100 about the Z-axis with a given angular velocity dependent upon a motor, such as an amplidyne, under the control of a motor controller at a given RPM. Rotor engagement and electrical or manual clutch parameters may be set manually set or by a controller or computer under program control (not shown). The control of a motor is well known by those skilled in the art.

In an exemplary embodiment, the system may be operated as follows. With reference to FIGS. 1a and 1c, in a transport mode, wheels 12a, 12b (on which are mounted one or more antenna arrays A1, A2) are positioned on a surface such as a road surface and rotatable about the y-axis (via cross member 23, FIG. 2) for rolling along the road surface. Towable platform 15 is elevated a predetermined distance from the road surface and includes a hitch for coupling to vehicle 5 (FIG. 1c) for transporting the mobile radar array to a designated location.

When the mobile radar array arrives at the designated location, deployment of the array occurs by releasing the towable platform from the towing vehicle and activating a lift mechanism (e.g. reference numeral 14 of FIG. 1b) for elevating the wheels containing the antenna arrays off of the road surface. In one configuration, the lift mechanism causes the platform to descend vertically to the road surface to operate as the base platform for the array. The lift may then further extend vertically to thereby elevate the wheels from the road surface. The wheels may then be rotated about the Y-axis to position the arrays A1, A2 at the proper orientation and locked in place. Platform 15 may operate as a base and lift 14 operates as a central axis (Z) about which the wheels carrying the antenna arrays revolve. Activation of the antenna arrays and control of the antenna by means of a motor for revolving the antenna thereby provides 360 degree coverage. When the deployment activity is completed, the lift mechanism lowers the wheels to once again engage the road surface and retracts the platform to its nominal position for engagement (via the hitch) with the towing vehicle.

Figure 4:
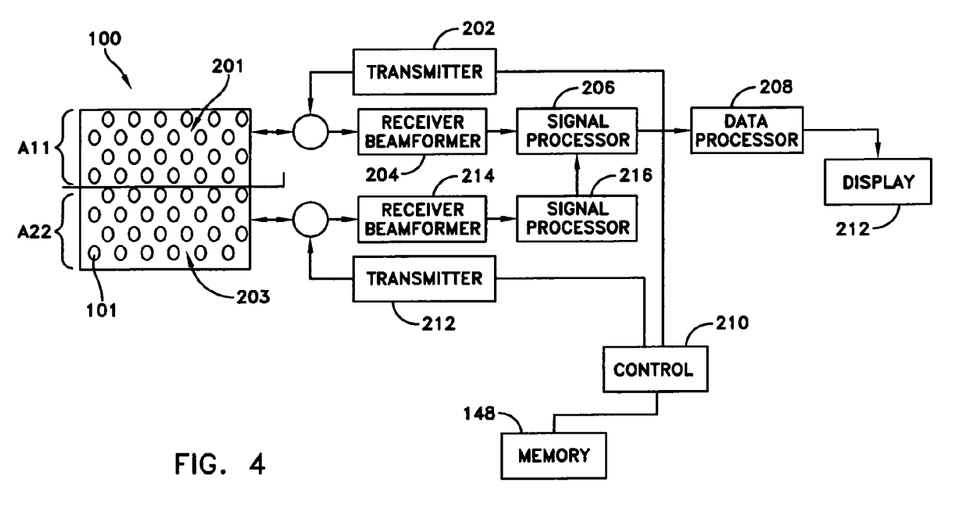
FIG. 4 is a simplified block diagram of a radar array configuration useful for implementing the radar operating mode for target detection and tracking.

Referring now to FIG. 4 there is shown a block diagram of an exemplary array system for target detection and tracking according to an embodiment of the present invention. The system is represented as a two array system of geometrically opposed radar aperture arrays A1, A2 and includes control function module 210 and a processor control logic for generating array control commands for controlling transmit and receive functions of T/R antenna elements 101 in the phased array antenna assembly. The front view of the phase array antenna system 100 has apertures A11, A22, and each may be associated with respective transmit/receive (T/R) modules (not shown). Such radiating elements may be dipoles, monopoles, and/or other such radiators as is understood in the art. Each T/R module provides the active transmit/receive electronics required to operate the antenna elements in the transmit and receive modes. In an exemplary embodiment, each T/R module comprises a circulator coupled to a variable attenuator or amplitude shifter via low noise receive amplifier. A phase shifter may be switchably coupled via a T/R switch to transmit to a high power amplifier or to a variable attenuator for operation in either a transmit or receive mode of operation.

It will be appreciated by those skilled in the art that the system may be employed in various short range and/or long range radar applications. By way of example, each array aperture is configured as an aperture of m×n elements. When the system is to be operated in a short range detection/tracking mode, transmit control commands are generated from control processor 210 and are provided to each of a pair of transmit modules 202, 212 coupled to the array. Each transmit module (202, 212) includes waveform generator and exciter circuitry that transmits signals to the phased array antenna assembly and hence to each of the arrays for providing two independently steerable arrays capable of separate and/or simultaneous transmit/receive processing.

Still referring to FIG. 4, for receive beam processing, reflected signal data is received via each of apertures A11 and A22 and separately processed by receiver circuitry modules 204, 214. Beamformer signal outputs from each array are down converted via an RF downconverter arrangement, A/D converted into digital form, and applied to produce desired beams. The signals representing the various beams are applied to signal processor logic 206, 216 which performs target signal detection and location processing, weight calculations (including, e.g. adaptive weight calculations), antenna nulling, and other signal processing of the received waveforms as is understood by those of ordinary skill in the art. Signal processor logic may be operatively coupled to one or more memory units (not shown) for storing, retrieving and processing array information including calibration data in the form of mutual coupling coefficients, dynamic range and SNR data, transmit power and received signal strength, for example. The beamformer and signal processor modules may also include or be operatively coupled to signal detection circuitry and functionality for detecting and processing the transmitted/received signals, including detection of null conditions and threshold comparisons.

Control Processor 210 may also include or be operatively coupled to performance monitoring and fault detection circuitry for processing and identifying failed or degraded elements for later maintenance or replacement.

The output of signal processor modules 206, 216 are fed into data processor logic 208, 218, which operate to perform target detection and location processing of the target data associated with each of the apertures of arrays A1, A2, and fed to a display unit 212 for displaying the information to a user.

The beamformer receiver in general provides for the application of phase shifts to each element (via phase shifters), and then sums the result. Further filtering and analog to digital (A/D) conversion may also be included. The signal processor will operate on this digital data to further filter the signal as needed, perform pulse compression, Doppler filtering, magnitude detection, and thresholding for target detection as is well known to those skilled in the art. The data processor coupled to the signal processor will use this target detection data to form trackers which track the targets and determine target characteristics, such as trajectory, and launch and/or impact points as is well known to those skilled in the art. The control processor 210 serves to coordinate the aperture modes by providing the appropriate control functions to the array elements and the transmit/receive processing. This will include the proper phase shifts to each element during transmit and receive when transmitting and receiving the full aperture (long range) pulse or sub-aperture (short range) pulse as is understood by those skilled in the art.

The processor, memory 148 and operating system with functionality selection capabilities can be implemented in software, hardware, firmware, or a combination thereof. In a preferred embodiment, the processor functionality selection is implemented in software stored in the memory. It is to be appreciated that, where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

Further, it is understood that the subject invention may reside in the program storage medium that constrains operation of the associated processors(s), and in the method steps that are undertaken by cooperative operation of the processor(s) on the messages within the communications network. These processes may exist in a variety of forms having elements that are more or less active or passive. For example, they exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Examples of the foregoing include distribution of the program(s) on a CD ROM or via Internet download.

The same is true of computer networks in general. In the form of processes and apparatus implemented by digital processors, the associated programming medium and computer program code is loaded into and executed by a processor, or may be referenced by a processor that is otherwise programmed, so as to constrain operations of the processor and/or other peripheral elements that cooperate with the processor. Due to such programming, the processor or computer becomes an apparatus that practices the method of the invention as well as an embodiment thereof. When implemented on a general-purpose processor, the computer program code segments configure the processor to create specific logic circuits. Such variations in the nature of the program carrying medium, and in the different configurations by which computational and control and switching elements can be coupled operationally, are all within the scope of the present invention.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A mobile antenna array system comprising:
   a towable platform having a pair of wheels operably coupled thereto, said wheels adapted for rolling along a road surface; and
   an antenna array mounted to an outer side of at least one of said wheels.

2. The mobile antenna array system of claim 1, further comprising a lift operably coupled to said platform to elevate said wheels.

3. The mobile antenna array system according to claim 2, further comprising a rotatable member that causes said antenna array to revolve about an azimuthal axis in response to rotation of said member when said wheels are elevated.

4. The mobile antenna array system of claim 3, wherein a rotatable axle is associated with each of said wheels to enable said wheels to rotate about a horizontal axis.

5. The mobile antenna array system of claim 3, further comprising a housing coupled to the platform and disposed between the wheels and containing electronic modules for controlling said antenna array.

6. The mobile antenna array system of claim 5, wherein the housing includes an axle extending therethrough, said axle operably coupled to said wheels for rotating said wheels about a horizontal axis.

7. The mobile antenna array system of claim 6, wherein the wheels are operatively coupled to a rotatable member for revolving the antenna array about an azimuthal axis.

8. The mobile antenna array of claim 2, wherein the lift comprises a hydraulic jack.

9. The mobile antenna array system of claim 1, wherein a first antenna array is mounted on an outer side of one of said wheels, and a second antenna array is mounted on an outer side of the other of said wheels.

10. The mobile antenna array system of claim 9, wherein the first and second antenna arrays are mounted to the wheels in opposed angular orientations.

11. A mobile antenna array system comprising:
    a towable platform having wheels operably coupled thereto for rolling along the ground;
    an antenna array mounted to an outer side of one of the wheels;
    a lift operably coupled to the platform for elevating the wheels from the ground surface; and
    a rotatable member for revolving the wheels about an azimuthal axis when said wheels are elevated.

12. The mobile antenna array system of claim 11, further comprising a housing containing an electronic control assembly for controlling said radar antenna array and disposed between said wheels.

13. The mobile antenna array system of claim 12, wherein said housing is operably coupled to said wheels and rotatable about said azimuthal axis when said wheels are elevated.

14. The mobile antenna array system of claim 12, further comprising a secondary antenna disposed on top of said housing.

15. The mobile antenna array system of claim 14, wherein said secondary antenna disposed on top of said housing is an IFF antenna.

16. The mobile antenna array system of claim 11, wherein said lift comprises a hydraulic jack.

17. A method of providing a mobile antenna array system comprising the steps of:
- providing a vehicle platform and operably coupling said platform to a rotatable axle;
- coupling one wheel to each end of said axle;
- mounting a first antenna about a hub portion of at least one of said wheels;
- coupling said platform to a vehicle to transport said first antenna and housing, wherein said wheels roll on the ground and support said platform in response to said vehicle movement;
- elevating said wheels when said platform is stationary to raise said wheels above the ground; and
- energizing said first antenna when said wheels are raised.

18. The method according to claim 17, further including the step of revolving the wheels about an azimuthal axis when said wheels are raised.

19. The method of claim 18, further comprising rotating the wheel about a horizontal axis to position the radar antenna array in a given orientation prior to said step of revolving.

20. The method according to claim 17, further comprising placing antenna energizing electronics in said housing.

* * * * *